(12) United States Patent
Ikeda et al.

(10) Patent No.: US 8,692,418 B2
(45) Date of Patent: Apr. 8, 2014

(54) ELECTRIC JUNCTION BOX AND POWER SUPPLY DEVICE HAVING THE SAME

(75) Inventors: Tomohiro Ikeda, Shizuoka (JP); Yoshinobu Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 842 days.

(21) Appl. No.: 12/923,648

(22) Filed: Sep. 30, 2010

(65) Prior Publication Data

US 2011/0080059 A1 Apr. 7, 2011

(30) Foreign Application Priority Data

Oct. 1, 2009 (JP) ................................. 2009-229902

(51) Int. Cl.
*H02J 7/00* (2006.01)
(52) U.S. Cl.
USPC ........................................................ 307/150
(58) Field of Classification Search
USPC ........................................................ 307/150
See application file for complete search history.

(56) References Cited

U.S. PATENT DOCUMENTS

| 2004/0043646 | A1 | 3/2004 | Takeuchi et al. |
| 2005/0233619 | A1 | 10/2005 | Takeuchi et al. |
| 2006/0291526 | A1 | 12/2006 | Yagi et al. |
| 2007/0202717 | A1* | 8/2007 | Vera et al. .................... 439/76.2 |

FOREIGN PATENT DOCUMENTS

| JP | 2004-96861 A | 3/2004 |
| JP | 2006-311755 A | 11/2006 |

* cited by examiner

*Primary Examiner* — Rexford Barnie
*Assistant Examiner* — Dru Parries
(74) *Attorney, Agent, or Firm* — Edwards Wildman Palmer LLP; James E. Armstrong, IV; Jonathon P. Western

(57) ABSTRACT

A downsized electric junction box and a power supply device having the same are provided. The electric junction box includes: a box main body including a connector engagement portion to be engaged with a connector and relay mount portions for mounting relays; and a wiring unit received in the box main body including mount portions mounted on a bottom wall of a lower case of the box main body and a plurality of terminal portions positioned inside the connector engagement portion and extending from the mount portions. A terminal positioning portion of the lower case includes a planar wall positioning the terminal portions on a surface thereof, extending walls extending from between the adjacent terminal portions, and parallely-projecting walls each projecting from an end of the extending wall in parallel with the planar wall. The mount portion includes a cutout portion through which the parallely-projecting wall is passed.

3 Claims, 4 Drawing Sheets

ELECTRIC JUNCTION BOX AND POWER SUPPLY DEVICE HAVING THE SAME

CROSS REFERENCE TO RELATED APPLICATION

The priority application Japan Patent Application No. 2009-229902 upon which this patent application is based is hereby incorporated by reference.

BACKGROUND OF THE INVENTION

1. Field of the Invention

The present invention relates to an electric junction box mounted for example to a motor vehicle as a moving body. The present invention also relates to a power supply device having the above-described electric junction box.

2. Description of the Related Art

Conventionally, for example in an electric vehicle propelled by an electric motor or a hybrid vehicle propelled by a combination of an internal-combustion engine and an electric motor, various power supply devices are applied as a power supply device for the electric motor. The power supply device of this kind is provided with a battery assembly having a plurality of batteries connected to each other in series and an electric junction box which outputs electric power, the electric power being temporary supplied from the battery assembly, to an inverter as external electric equipment via a relay (refer for example to Japanese Patent Application Publication No. 2004-96861 and Japanese Patent Application Publication No. 2006-311755).

The above-described electric junction box includes: a box main body having a component mounting portion to which an electric component such as a relay is mounted and a connector engagement portion with which a connector for activating the relay is engaged; and a wiring unit received inside of the box main body and electrically connecting the relays and the connector according to a predetermined pattern.

The box main body includes a lower case and an upper case attached to the lower case and having the component mounting portions and the connector engagement portion. The lower case and the upper case are attached to each other in an overlapping relationship so as to receive thereinside the wiring unit.

The wiring unit includes a plurality of bus bars made of conductive metal. The bus bar is constituted of conductive metal that has been subjected to punching and bending to be formed into a band-plate-like shape having a predetermined pattern. Some of the bus bars include a mount portion to be mounted at the lower case and a terminal portion extending perpendicularly from the mount portion and to be positioned inside of the connector engagement portion.

The above-described electric junction box is assembled such that the wiring unit is received inside of the box main body. Then the connector is engaged with the connector engagement portion and the relays are mounted to the component mounting portions. The assembled electric junction box is then mounted to the battery assembly to be mounted to the vehicle.

SUMMARY OF THE INVENTION

Technical Problem

For the above-described electric junction box disclosed in the above-mentioned Japanese Patent Application Publication No. 2004-96861 and No. 2006-311755, the upper case includes a positioning portion provided for positioning the terminal portion when attaching the lower case and the upper case to each other. The positioning portion is arranged inside of the connector engagement portion and includes an inclined face inclined such that the inclined face narrows an opening of the connector engagement portion with increasing distance from the lower case. The positioning portion allows the terminal portion to abut on the inclined face and then slide on the inclined face, thereby positioning the terminal portion to a predetermined positioned when attaching the lower case and the upper case to each other.

Furthermore, for the above-described electric junction box disclosed in the above-mentioned prior arts, the electric junction box is require to be mounted on the battery assembly so as to be aligned along a direction in which the batteries in the battery assembly are aligned in order to reduce an installation space in the vehicle. For the electric junction box mounted in a manner described above, the connector engagement portion extends perpendicularly from the upper case along a direction in which the batteries in the battery assembly are aligned, in order to facilitate an engagement of the connector with the connector engagement portion. In this case, the length of the terminal portion becomes long and thus the length of the inclined face of the positioning portion becomes long. Therefore, there is a problem that an interval between the adjacent terminal portions gets wider, causing an increase in size of the electric junction box. In addition, if there are provided a number of terminal portions, each interval between the adjacent terminal portions is required to be wide, causing a further increase in size of the electric junction box.

The present invention is intended to address these problems. Thus, an object of the present invention is to provide an electric junction box which can be downsized even if the connector engagement portion is provided thereto. Another object of the present invention is to provide a power supply device having the above-described electric junction box.

Solution to Problem

In order to solve the above-described problems and achieve the above-described object, the present invention provides an electric junction box including: a box main body having a connector engagement portion with which a connector engages and component mounting portions at which electric components are mounted; and a wiring unit received inside of the box main body and electrically connecting, according to a predetermined pattern, the electric components mounted at the component mounting portions with the connector engaged with the connector engagement portion. The wiring unit includes mount portions to be mounted on a bottom wall of the box main body and a plurality of terminal portions extending perpendicularly from the mount portions and arranged parallel to each other at an interval, the plurality of terminal portions to be positioned inside of the connector engagement portion. The box main body includes a planar portion positioning the terminal portions on a surface thereof, extending portions extending perpendicularly from between the adjacent terminal portions, and parallely-projecting portions each projecting, in parallel with the planar portion, from an end portion of the extending portion distant from the planar portion. Furthermore, the mount portion includes a cutout portion through which the parallely-projecting portion is passed.

According to the electric junction box of the present invention described above, since the box main body includes the extending portions and the parallely-projecting portions described above, the terminal portions placed on the planar portion can be positioned by the planar portion and the parallely-projecting portions. Thus, when the wiring unit is mounted to the box main body, the terminal portions of the wiring unit can be positioned properly.

Consequently, a positioning portion provided for guiding the terminal portions to a predetermined position can be downsized. Thus, the box main body can be assembled without providing thereto the positioning portion such as the one described in the prior art, but instead providing a positioning portion having the minimum required size. Thus, there is no need to increase the interval between the adjacent terminal portions. Consequently, the electric junction box can be downsized even if there is provided the connector engagement portion including the plurality of the relatively long terminal portions.

Furthermore, since the mount portion of the wiring unit includes the cutout portion, the wiring unit can be mounted to the box main body by moving the wiring unit to the box main body along the longitudinal direction of the terminal portion. Consequently, the assembly of the electric junction box can be facilitated.

Furthermore, since the mount portion of the wiring unit includes the cutout portion and the box main body includes the extending portions, both of the thickness of the extending portion and the interval between the adjacent terminal portions can be made equal to the minimum required interval between the adjacent terminal portions. Consequently, the electric junction box can be downsized.

Furthermore, according to the present invention, there is also provided a power supply device including: a battery assembly having a plurality of batteries connected to each other in series; and the electric junction box described above which outputs electric power supplied from the battery assembly to electric equipment. Consequently, since the power supply device of the present invention is provided with the downsized electric junction box as described above, the power supply device itself can also be downsized.

Furthermore, according to the power supply device of the present invention described above, the terminal portions are arranged so the longitudinal direction thereof is parallel to a direction in which the batteries are aligned. Consequently, the connector can be easily engaged with the connector engagement portion.

DETAILED DESCRIPTION OF THE PREFERRED EMBODIMENTS

An electric junction box and a power supply device according to one embodiment of the present invention are explained below in reference with FIG. 1 through FIG. 6. A power supply device 1 according to one embodiment of the present invention is mounted for example to an electric vehicle propelled by an electric motor or to a hybrid vehicle propelled by a combination of an internal-combustion engine and an electric motor to supply power to the electric motor.

Figure 1:
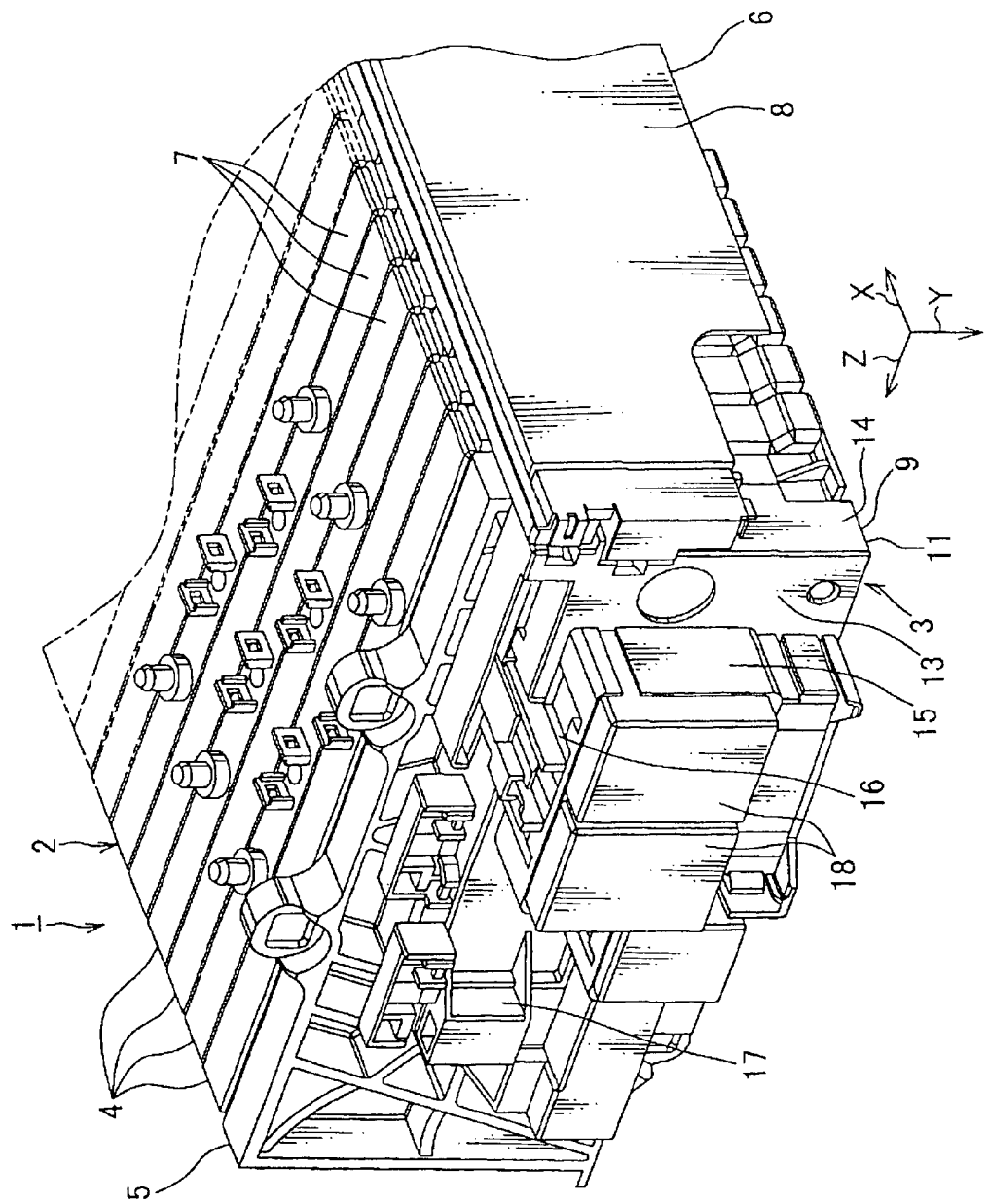
FIG. 1 is a perspective view showing a portion of a power supply device according to one embodiment of the present invention.

As shown in FIG. 1, the power supply device 1 according to this embodiment includes a battery assembly 2 and an electric junction box 3 mounted to the battery assembly 2.

The battery assembly 2, as shown in FIG. 1, includes a plurality of batteries 4, a pair of end plates 5 (only one of the end plates 5 is shown) fixing the batteries 4 so the batteries 4 are aligned adjacent to each other in an overlapping relationship (thus the batteries 4 are bundled together and fixed by the end plates 5), and a pair of bus bar modules 6 (only one of the bus bar modules 6 is shown).

The respective batteries 4 include a thick plate-like battery main body 7, a positive electrode provided at one of end faces of the battery main body 7 at right and left hand sides in FIG. 1 and a negative electrode provided at the other one of the above-described end faces of the battery main body 7.

The batteries 4 are aligned adjacent to each other in an overlapping relationship such that the positive electrode and the negative electrode of the adjacent batteries 4 are arranged adjacent to each other. That is, the plurality of the batteries 4 is arranged adjacent to each other so the positive electrode and the negative electrode thereof are positioned alternately.

The respective end plates 5 are made of insulating material and formed into a thick plate-like shape. The respective end plates 5 of the pair are arranged so as to sandwich the plurality of batteries 4 therebetween in an overlapping relationship. In addition, the pair of end plates 5 are fixed to each other together with the plurality of batteries 4 sandwiched therebetween via bolts and nuts (not shown).

The respective bus bar modules 6 include a plate 8 made of insulating synthetic resin and a plurality of conductive bus bars. The bus bars of the plate 8 are disposed on the both end faces of the batteries 4 including the electrodes. The bus bars are attached to the plate 8 and connect the electrodes of the adjacent batteries to each other. That is, the bus bar module 6 connects the plurality of batteries 4 to each other in series. Furthermore, one of the bus bar modules 6 at right hand side in FIG. 1 includes: a connecting bus bar for a connection between the electric junction box 3 and the electrode of the battery 4 located at one end of the plurality of batteries 4 connected to each other in series; and a connecting cable for a connection between the electric junction box 3 and the electrode of the battery 4 located at the other end of the plurality of batteries 4 connected to each other in series.

The above-described bus bar modules 6 connect the batteries 4 to each other in series and further connect the batteries 4 to the electric junction box 3, thereby supplying power from the plurality of batteries 4 connected in series to the electric junction box 3.

In FIG. 1, a X-direction corresponds to a direction in which the plurality of batteries 4 are aligned as well as the longitudinal direction of the battery assembly 2, a Z-direction corresponds to the width direction of the battery assembly 2 and a Y-direction corresponds to the height direction of the battery assembly 2.

Figure 2:
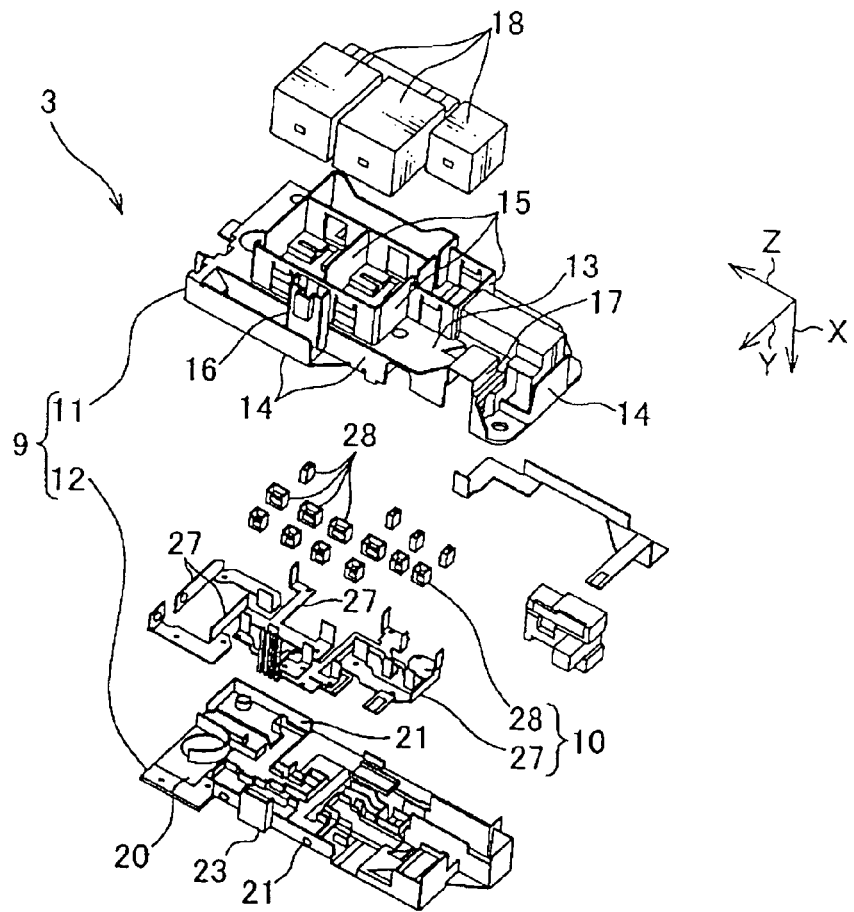
FIG. 2 is an exploded perspective view of an electric junction box of the power supply device shown in FIG. 1.

The electric junction box 3 is disposed onto and attached to one of the end plates 5 located in front side in FIG. 1. The electric junction box 3, as shown in FIG. 2, includes a box main body 9 and a wiring unit 10.

The box main body 9 includes the upper case 11 and the lower case 12 which are to be attached to each other. These cases 11, 12 are made of insulating synthetic resin and are formed by a known injection molding.

Figure 3:
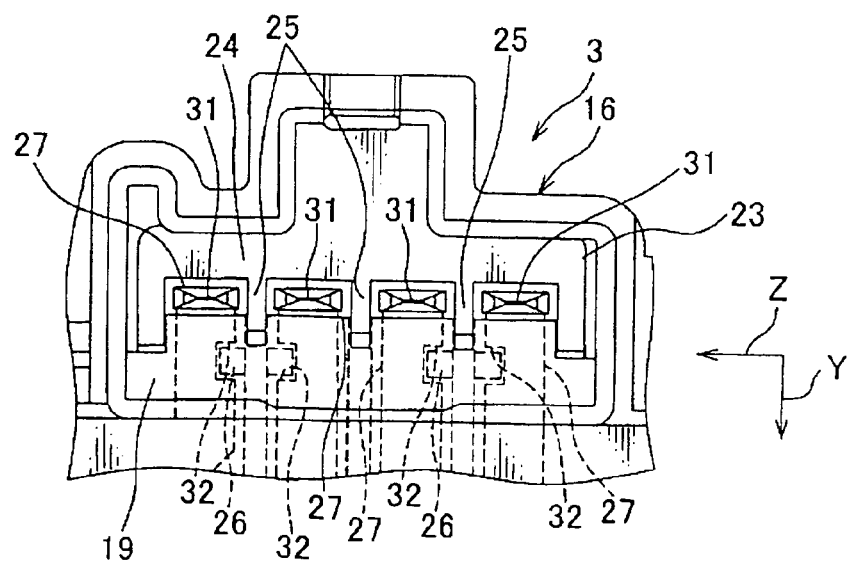
FIG. 3 is a front view showing a connector engagement portion of the electric junction box shown in FIG. 2.

The upper case 11, as shown in FIG. 3, includes an upper wall 13, peripheral walls 14 extending perpendicularly from an outer edge of the upper wall 13, a plurality of relay mounting portions 15 (correspond to component mounting portions), a connector engagement portion 16 and an output connector portion 17. The relay mounting portions 15 are provided at the upper wall 13. Relays 18 are mounted to the relay mounting portions 15. The connector engagement portion 16 is formed into a tubular shape and extends perpendicularly from the upper wall 13. The connector engagement portion 16 engages with a connector of a wire harness (not shown) which activates the relays 18. In addition, the connector engagement portion 16 is provided with a cover wall 19 (shown in FIG. 3) covering an opening of the connector engagement portion 16 at a side of the upper wall 13. The cover wall 19 positions later-described terminal portions 31 between the cover wall 19 and a later-described planar wall 24.

The output connector portion 17 is formed into a tubular shape and is provided at the upper wall 13 of the upper case 11 in parallel with a surface of the upper wall 13. The output connector portion 17 engages with a connector (not shown) provided at an end of a cable connected to an inverter (corresponds to electric equipment) to supply electric power of the battery assembly 2 to the inverter.

The lower case 12, as shown in FIG. 2, includes a bottom wall 20 and peripheral walls 21 extending perpendicularly from an outer edge of the bottom wall 20. The lower case 12 and the upper case 11 are attached to each other by moving these cases 11, 12, while the cases 11, 12 are maintained parallel to each other, towards each other along a direction perpendicular to both of the bottom wall 20 and the upper wall 13, such that the peripheral portions 14, 21 (or one of the peripheral portions 14, 21) abut on the upper wall 13 or on the bottom wall 20, and such that the upper wall 13 and the bottom wall 20 are arranged parallel to each other with a space between each other.

These cases 11, 12 (i.e. the box main body 9) are mounted to the battery assembly 2 so the bottom wall 20 is disposed on the one of the end plates 5. In this manner, the box main body 9, i.e. the electric junction box 3, is mounted to the battery assembly 2 so as to be aligned with the battery assembly 2 along the X-direction in which the plurality of batteries 4 are aligned.

Figure 4:
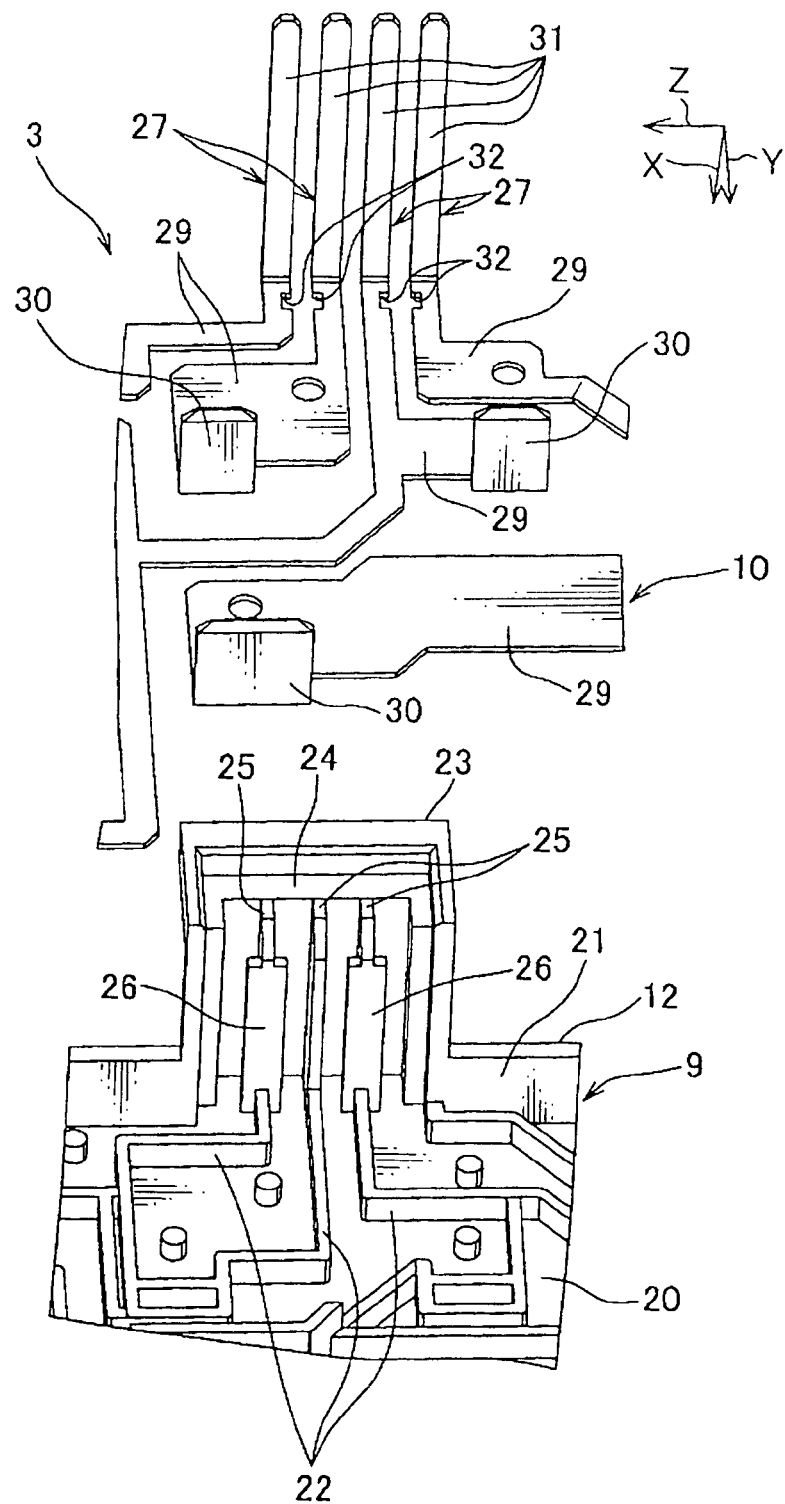
FIG. 4 is a perspective view showing a portion of a terminal positioning portion and bus bars to be placed inside of the connector engagement portion shown in FIG. 3.
Figure 5:
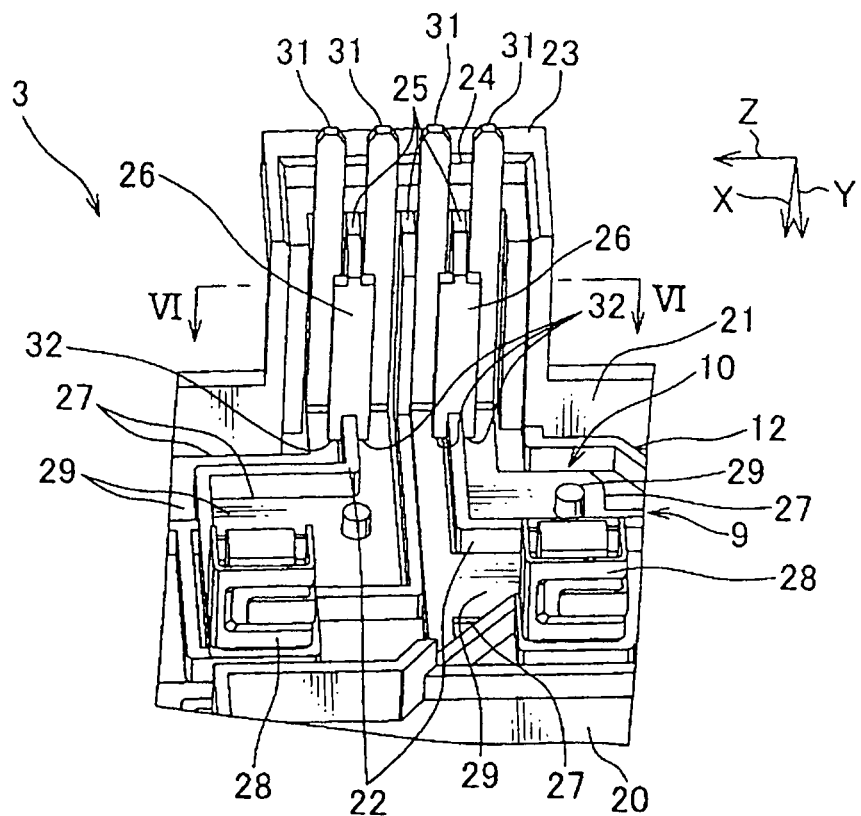
FIG. 5 is a perspective view showing the terminal positioning portion and the bus bars shown in FIG. 4 being attached together.

Furthermore, the bottom wall 20 of the lower case 12 includes positioning walls 22 (shown in FIG. 4) extending perpendicularly from a surface of the bottom wall 20 provided to position later-described bus bars 27. In addition, as shown in FIG. 3 and FIG. 4, the lower case 12 is provided with a terminal positioning portion 23 to be placed inside of the connecter engagement portion 16 when the lower case 12 is attached to the upper case 11. The terminal positioning portion 23 serves to position the later-described terminal portions 31. As shown in FIG. 4 and FIG. 5, the terminal positioning portion 23 includes: the planar wall 24 (corresponds to a planar portion) extending perpendicularly from the bottom wall 20 towards the upper wall 13 and arranged to be placed inside of the connector engagement portion 16; a plurality of extending walls 25 (correspond to extending portions) extending perpendicularly from the planar wall 24; and parallely-projecting walls 26 (correspond to parallely-projecting portions).

Figure 6:
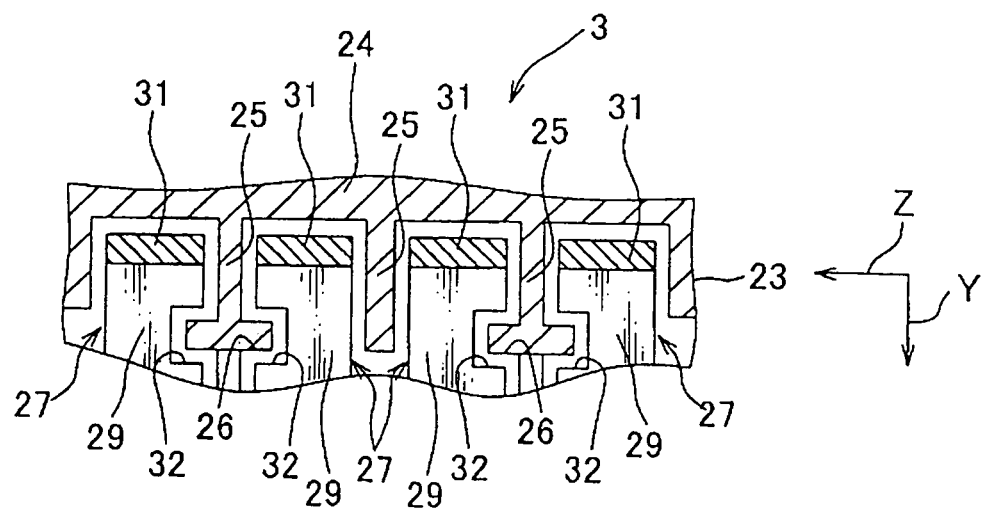
FIG. 6 is a cross-sectional view taken along a VI-VI line shown in FIG. 5.

The planar wall 24 is arranged so that a surface thereof is parallel to the X-direction in which the batteries 4 are aligned. The terminal portions 31 are placed on the surface of the planar wall 24. The respective extending walls 25 extend linearly in parallel to the X-direction and are arranged parallel to each other with a space between each other. The extending walls 25 extend perpendicularly from the planar wall 24 and from between the adjacent terminal portions 31. In the shown example, there are provided three extending walls 25. As shown in FIG. 6, the parallely-projecting walls 26 are provided to the two extending walls 25 of the three extending walls 25 located at both ends thereof, respectively. The each parallely-projecting wall 26 is provided at an end portion of the extending wall 25 distant from the planar wall 24 so as to project from the end portion of the extending wall 25. The respective parallely-projecting walls 26 extend linearly along the X-direction and are arranged parallel to the planar wall 24 with a space from the planar wall 24.

The wiring unit 10, as shown in FIG. 2, includes the plurality of bus bars 27 and a plurality of connection terminals 28. The respective bus bars 27 are constituted of conductive metal that has been subjected to punching and bending. As shown in FIG. 4, the bus bars 27 integrally include mount portions 29 to be mounted on the surface of the bottom wall 20 of the lower case 12, i.e. on the box main body 9, projecting pieces 30 extending perpendicularly from the mount portions 29, respectively, a plurality of terminal portions 31 extending perpendicularly from the mount portions 29, respectively, and an output terminal portion (not shown).

The mount portions 29 are placed between positioning walls 22 of the lower case 12. The projecting piece 30 extends perpendicularly from the mount portion 29 towards the relay 18 mounted to the relay mounting portion 15. The terminal portions 31 extend perpendicularly from the mount portions 29, respectively. The terminal portions 31 are positioned between the planar wall 24 and the parallely-projecting walls 26 and positioned inside of the connector engagement portion 16. The length of the terminal portion 31 is sufficiently longer than the length of the projecting piece 30. In addition, the respective extending walls 25 are arranged between the terminal portions 31. In the shown example, there are provided four terminal portions 31. When a connector is engaged with the connector engagement portion 16, the connector connects with the terminal portions 31.

Furthermore, an end of the mount portion 29 adjacent to the terminal portion 31 is provided with a cutout portion 32, as shown in FIG. 4 through FIG. 6. The cutout portion 32 is formed by cutting out a portion of the mount portion 29 from an edge of the mount portion 29. The parallely-projecting walls 26 are passed through the cutout portions 32 of the mount portions 29.

The output terminal portion (not shown) extends perpendicularly from the mount portion 29 and is arranged inside of the output connector portion 17. When the above-described connector connected to the inverter is engaged with the output connector portion 17, a terminal of this connector connects to the output terminal portion.

Furthermore, the bus bar 27 is provided with a power supply portion to which the above-described connecting bus bar and the connecting cable of the bus bar module 6 are connected. The bus bar 27 is attached to the lower case 12 by moving the mount portion 29 oriented parallel to the surface of the bottom wall 20 towards the bottom wall 20 of the lower case 12 along the longitudinal direction of the terminal portion 31.

The connection terminals 28 are connected to the projecting pieces 30, i.e. the bus bars 27, and to terminals of the relays 18 mounted to the relay mounting portion 15, thereby connecting the bus bars 27 and the relays 18 to each other.

The wiring unit 10 described above connects the battery assembly 2 with the relays 18 and such according to a predetermined pattern, and thereby outputs power supplied from the battery assembly 2 to the inverter via the relays 18. The wiring unit 10 also connects the relays 18 with the connector of the wire harness (not shown) for activating the relays 18.

The electric junction box 3 having the above-described structure is assembled so the wiring unit 10 is received between the upper case 11 and the lower case 12, and the relays 18 are mounted to the relay mounting portions 15. Then, the lower case 12 is attached to the end plate 5, and the connecting bus bar and the connecting cable are connected to the power supply portion of the bus bar 27, thereby mounting the electric junction box 3 to the battery assembly 2 to constitute the power supply device 1. Furthermore, the connectors are engaged with the respective connector engagement portion 16 and the output connector portion 17. In such a manner, the electric junction box 3, i.e. the power supply device 1, is mounted to the vehicle. The above-described power supply device 1 outputs power supplied from the battery assembly 2 to the inverter via the relays 18, the relays 18 being controlled by ECU (Electronic Control Unit) mounted to the vehicle via the wire harness.

According to this embodiment, the lower case 12 of the box main body 9 includes: the extending walls 25 extending from the planar wall 24 and from between the adjacent terminal portions 31; and the parallely-projecting walls 26 projecting from the end portion of the extending walls 25 in parallel to the planar wall 24. Thus, the terminal portions 31 placed at the planar wall 24 are positioned by the planar wall 24 and the parallely-projecting walls 26. Consequently, the terminal portions 31 of the wiring unit 10 can be positioned properly at the box main body 9 when the wiring unit 10 is mounted to the box main body 9. Consequently, the positioning portion which serves to guide the terminal portions 31 to a predetermined position can be downsized.

Therefore, the upper case 11 and the lower case 12 can be attached to each other to assemble the box main body 9 without providing the positioning portion such as the one of the prior art. Also, there is no need to provide the positioning portion to the cover wall 19, or even if the positioning portion is arbitrarily provided to the cover wall 19, the size of this positioning portion can be minimized. For this reason, there is no need to broaden the interval between the terminal portions 31 when there is provided the connector engagement portion 16 having the plurality of relatively long terminal portions 31. As a result, the electric junction box 3 can be downsized.

Furthermore, since the mount portion 29 of the bus bar 27 of the wiring unit 10 is provided with the cutout portion 32, the bus bar 27 of the wiring portion 10 can be mounted to the lower case 12 of the box main body 9 by moving the bus bar 27 towards the bottom wall 20 of the lower case 12. Consequently, the assembly of the electric junction box 3 can be facilitated.

Furthermore, since the mount portion 29 of the bus bar 27 of the wiring unit 10 is provided with the cutout portion 32, and the extending portions 25 are provided to the lower case 12, both of the thickness of the extending portion 25 and the interval between the adjacent terminal portions 31 can be made equal to the minimum required interval between the terminal portions 31, the minimum required interval corresponding to an interval required to prevent the terminal portions from short circuiting. Consequently, the electric junction 3 can be downsized.

Furthermore, the power supply device 1 according to this embodiment is provided with the above-described electric junction box 3. Consequently, in addition to the electric junction box 3, the power supply device 1 itself can also be downsized.

Furthermore, for the power supply device 1 described above, the terminal portions 31 are arranged parallel to the direction in which the batteries 4 are aligned. Consequently, the connector can be easily engaged with the connector engagement portion 16.

The above-described embodiment is only a representative embodiment of the present invention, and the present invention is not limited thereto. That is, various changes can be made without departing the scope of the present invention. For example, the cover wall 19 may include the positioning portion guiding the to terminal portions 31 to be positioned properly, whereas in the above-described embodiment the cover wall 19 does not. Furthermore, the electric junction box 3 may not be directly connected to the battery assembly 2.

What is claimed is:

1. An electric junction box comprising:
 a box main body having a connector engagement portion with which a connector engages and component mounting portions at which electric components are mounted; and a wiring unit received inside the box main body and electrically connecting, according to a predetermined pattern, the electric components mounted at the component mounting portions with the connector engaged with the connector engagement portion,
wherein
 the wiring unit includes mount portions to be mounted on a bottom wall of the box main body and a plurality of terminal portions extending perpendicularly from the mount portions and arranged parallel to each other at an interval, the plurality of terminal portions being positioned inside of the connector engagement portion,
 the box main body includes a planar portion positioning the terminal portions on a surface thereof, extending portions extending perpendicularly from between the adjacent terminal portions, and parallely-projecting portions each projecting in parallel to the planar portion from an end portion of the extending portion distant from the planar portion, and
 the mount portion includes a cutout portion through which the parallely-projecting portion is passed.

2. A power supply device comprising:
 a battery assembly having a plurality of batteries connected to each other in series, and
 the electric junction box according to claim 1, the electric junction box outputting electric power supplied from the battery assembly to electric equipment.

3. A power supply device according to claim 2, wherein the terminal portions are positioned so a longitudinal direction thereof is parallel to a direction in which the batteries are aligned.

* * * * *